United States Patent [19]
Hoen

[11] 4,331,413
[45] May 25, 1982

[54] QUARTER TURN PLUG FASTENER
[75] Inventor: Cuyler Hoen, Rennesselaer, N.Y.
[73] Assignee: Simmons Fastener Corporation, Albany, N.Y.
[21] Appl. No.: 113,815
[22] Filed: Jan. 21, 1980
[51] Int. Cl.³ ............................................. F16B 13/08
[52] U.S. Cl. .................................. 411/44; 24/221 R; 411/55; 411/57
[58] Field of Search ......................... 85/5 P, 70, 73, 74, 85/77, 78, 80, 81; 24/73 RM, 221 R, 221 A, 221 K; 411/34, 44, 57, 80, 55

[56] References Cited
U.S. PATENT DOCUMENTS

| | | | |
|---|---|---|---|
| 1,232,274 | 7/1917 | Gay | 85/77 |
| 2,270,814 | 1/1942 | Scribner | 24/221 K X |
| 2,408,559 | 10/1946 | Keating | 85/77 |
| 2,525,117 | 10/1950 | Campbell | 85/77 |
| 2,688,894 | 9/1954 | Modrey | 85/70 |
| 2,753,610 | 7/1956 | Miller | 85/70 X |
| 3,093,220 | 6/1963 | Modrey | 85/70 X |
| 3,262,168 | 7/1966 | Overhoff | 85/82 X |
| 3,406,431 | 10/1968 | Armstrong | 85/80 X |
| 4,007,516 | 2/1977 | Coules | 85/82 X |

FOREIGN PATENT DOCUMENTS

| | | | |
|---|---|---|---|
| 1199737 | 6/1959 | France | 85/70 |
| 1432352 | 2/1966 | France | 85/5 P |
| 1469966 | 1/1967 | France | 85/73 |

Primary Examiner—Thomas J. Holko
Attorney, Agent, or Firm—Eliot S. Gerber

[57] ABSTRACT

A fastener for removably securing a plurality of panels includes a stud member having a top turning means, such as a flat handle, a central shank portion and a bottom camming (knob) portion. The fastener, upon being rotated, is moved along its axis by ramp means secured to a panel. The camming portion acts against the internal walls of spreadable flexible finger members to spread them outwardly and thereby grip the other panel.

1 Claim, 6 Drawing Figures

QUARTER TURN PLUG FASTENER

BACKGROUND OF THE INVENTION

The present invention relates to fasteners and more particularly to those fasteners which removably fasten two or more panels.

It is frequently desired, both in industrial and consumer products, to secure two or more panels. Many types of fasteners permit the panels to be separated and later refastened. However, although many types of fasteners have been commercially produced, and many more types have been proposed, for example, in the patent literature, there is a constant need for improved fasteners.

One general type of fastener comprises a stud member which fits into a socket member positioned in a hole in a panel. The stud member may be rotated to expand the socket outwardly and grip the edges or sidewall of the panel hole.

One fastener of this general type is shown in U.S. Pat. No. 1,300,580 to Carr, in which an expandable and contractible stud fits in a socket. The socket in one embodiment, may be expanded. In another embodiment the stud is locked in the socket by a cam turned by a handle (turn button) and the cam turns and expands the stud.

In U.S. Pat. No. 3,272,061 to Seckerson a stud is positioned in a tubular sleeve socket. The stud has lugs which bite into the sleeve when the stud is turned to expand the socket wall outwardly.

In U.S. Pat. No. 2,283,526 to Albin a stud (key member) carries a cross-pin (cross-bar) near its bottom edge. Upon rotation of the stud the cross-pin rides on spring loaded ramp members (cam or wedge members) and the cross-pin engages in a recess at the end of the ramp.

In the fasteners described in these patents the stud, upon its rotation, is neither moved along its axis nor applies equal outward cam action to a socket member.

OBJECTIVES AND FEATURES OF THE PRESENT INVENTION

It is an objective of the present invention to provide a fastener which may removably secure two or more panels.

It is a further objective of the present invention to provide a fastener which may removably secure two or more panels and which may be fastened to one of the panels and spread upon the sidewalls of the other panel or panels.

It is a still further objective of the present invention to provide a fastener which may removably secure two or more panels and which may secure the panels or unfasten the panels by a quarter turn of its separating member.

It is a still further objective of the present invention to provide a fastener which may removably secure two or more panels and which may be manufactured from injectable plastic resin so as to be produced under mass production methods at a relatively low cost of production and which may be used to fasten and unfasten the panels without injury to the sidewalls or edges of the panel members.

It is a feature of the present invention to provide a fastener securing together a first and a second panel each with an opening, generally a round hole. The fastener includes a stud member having a turning means, for example, a flat handle, by which the stud member is rotated about its axis, for example, a one-quarter turn, to open or close the fastener. A ramp means is fixed to the side of said first panel away from said second panel. The ramp means cams the turning means to move the stud member along its axis when the stud member is rotated to close the fastener. For example, the bottom of the handle may ride on two diagonally opposite ramp portions of a ring. A plurality of flexible finger members are joined together and arranged around the stud member and positioned within the hole of the second panel. Each finger member has an external wall which is wedged against the second panel. When the user rotates the stud member, the stud member cam means causes axial movement of the stud member. It contracts the internal walls of the finger means and cams them outwardly with respect to the axis of the stud member to wedge the finger members against the internal wall of the second panel hole.

BRIEF DESCRIPTION OF THE DRAWINGS

Other objectives of the present invention will be apparent from the following detailed description set forth below which provides the inventor's best mode of practicing the invention. The detailed description should be taken in conjunction with the accompanying drawings, in which.

DETAILED DESCRIPTION OF THE INVENTION

The present invention relates to a fastener which is attached to a first panel 10 and releasably secures one or more other panels to the first panel 10. As shown in the preferred embodiment of the invention described below, the fastener is a one-quarter turn fastener, that is, it either opens or alternatively closes on a rotation of 90°, i.e., a one-quarter turn. Alternatively, the fastener may be made so that it opens or closes in a shorter or longer rotation, for example, 50° or 130°, or in even shorter or longer turns.

Figure 1:
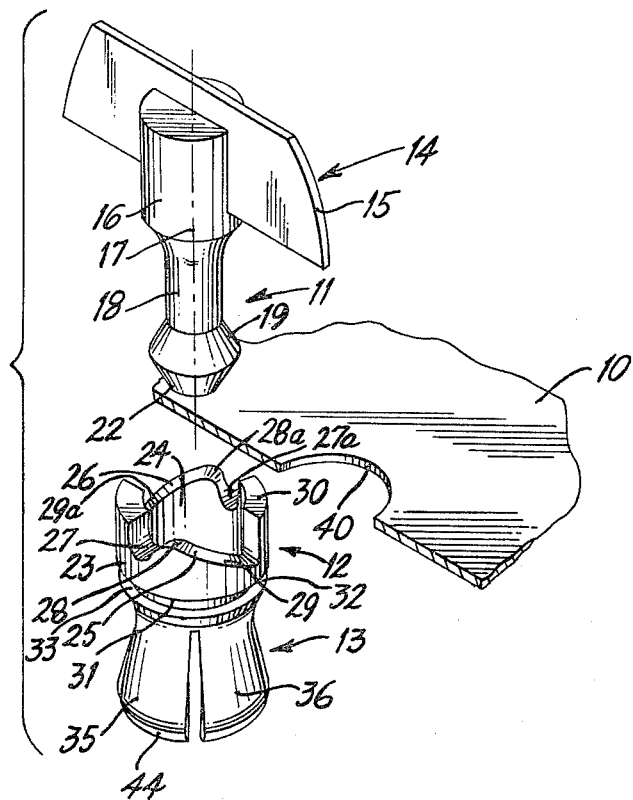
FIG. 1 is an exploded perspective view of the parts constituting the fastener of the present invention.

As shown in FIG. 1, the fastener generally comprises a stud member 11, a ramp means 12, and a plurality of flexible finger members 13. The stud member 11 has a turning means 14 which may be a flat handle 15. Alternatively, other types of turning means may be utilized, for example, the top of the stud member may have a slot for a screwdriver or may have an indented hexagonal opening or may have external square or hexagonal walls, so that it may be gripped with an appropriate tool. The turning means may be formed integrally as one piece with the remainder of the stud member 11 or alternatively may be joined to the shank portion 18. The stud member 11 also comprises an upper body portion 16 which is a right-handed round cylindrical portion, i.e., a cross-section taken perpendicularly to the imaginary axis 17 through the center of the stud member 11 to be a circle. The shank portion 18 of the stud member 11 is a reduced waist portion which is also preferably a circle at each of its cross-sections taken perpendicularly to the imaginary axis 17. The camming portion 19 of the stud member 11 comprises an outwardly slanting shoulder portion 22. These portions form an enlarged bulbous or bump-like camming portion 19.

The ramp means 12 is preferably formed as a ring 23 having an opening 24 therein. The opening 24 is round in cross-section and slightly larger in diameter than the diameter of the upper portion 16 of the shaft member, so that the upper portion 16 is rotatable within the hole 24 of the ring 23. The ring 23 has two ramps 25 and 26 which are diagonally on opposite sides of the imaginary axis 17. Each of the ramps 25 and 26 has a lower locking indentation 27, a raised protrusion portion 28 and an unlocking ramp position 29, these portions being labeled respectively 27a, 28a and 29a in the case of the ramp 26. The top of the ring 30, i.e., the two short pieces between the two ramps 25 and 26, is preferably flat. The bottom of the ring 31 is attached to the first panel 10, for example, by expansion of two opposed solid portions (bosses) which fit into opposed indentations of the hole. Alternatively, and as shown in the preferred embodiment of FIGS. 1 through 6, the ring 23 is an integral one-piece member with the flexible fingers 13 having an indented top shoulder 32 which forms a circumferential groove 33 which securely grips the first panel 10 after the flexible fingers 13 have been inserted through the hole 40 in the panel 10.

Figure 2:
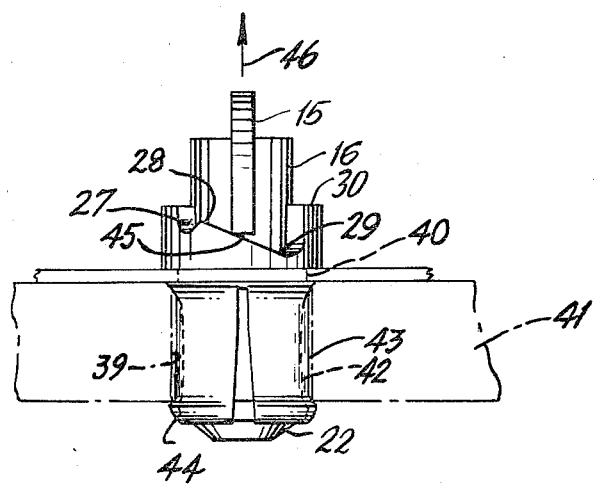
FIG. 2 is a side plan view of the assembled fastener of the present invention showing the fastener midway being opened and being closed.
Figure 3:
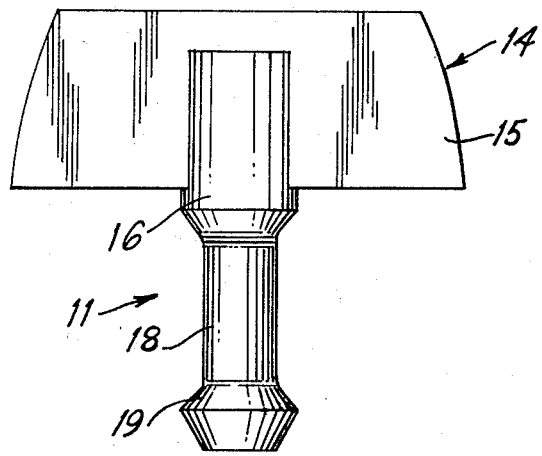
FIG. 3 is a side plan view of the stud member of the fastener of the present invention.
Figure 4:
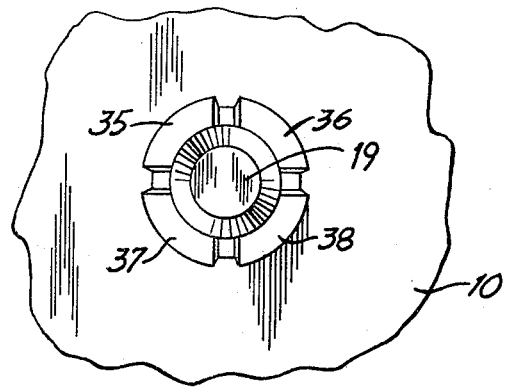
FIG. 4 corresponds to the showing of FIG. 2 and shows a bottom view of the fastener of the present invention.
Figure 5:
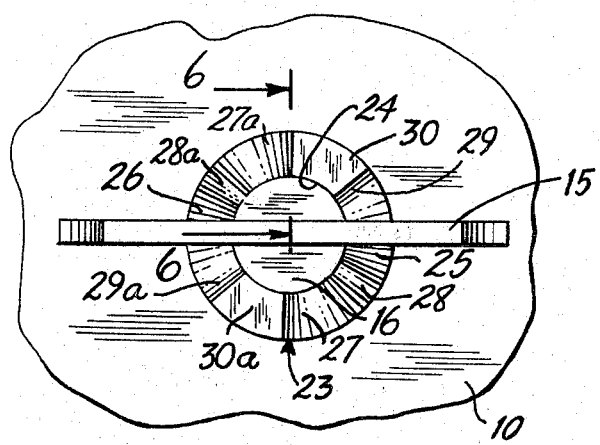
FIG. 5 corresponds to FIG. 2 and shows a top plan view of the assembled fastener of the present invention.
Figure 6:
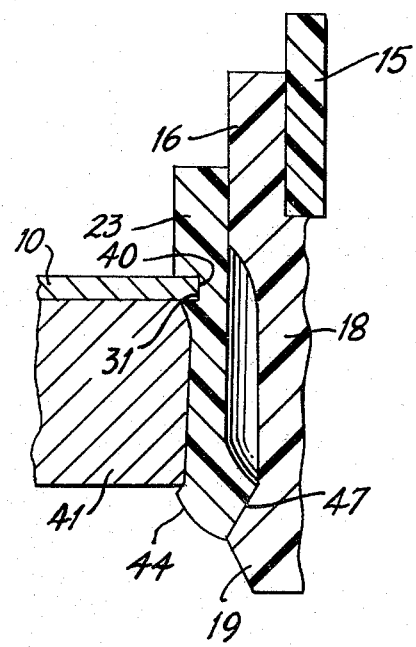
FIG. 6 is a cross-sectional view taken along lines 6—6 of FIG. 5.

As shown in FIG. 4, there are four flexible fingers 35, 36, 37 and 38. Alternatively, but not shown, there may be as few as three fingers or there may be more fingers than four, for example 5, 6, 7 or 8. As shown in FIG. 2, each of the fingers is sufficiently flexible and resilient so that when pushed outwardly, i.e., in a direction away from the axis 17, the fingers will grip the internal wall 39 of the hole 40 in the second panel 41. Although only a single second panel 41 is shown, more than one panel may be used, i.e., the second panel 41 may be a collection of individual plates each of which has a hole therethrough. When expanded outwardly, each of the fingers 35-38 moves from its normally inwardly contracted position 42 to its outwardly expanded position 43 shown in full lines in FIG. 2 in order to grip the internal wall 39. Each of the fingers has an outward bottom projection 44 which is below the bottom edge of the second panel 41. This projection 44, when expanded outwardly, aids in firmly gripping the second panel. It will be understood, however, that this projection 44 is optional as the fastener may be used in those holes in which the hole in the second panel is deeper than the length of the flexible fingers.

In operation, in order to lock the fastener, the user brings the first panel 10 into alignment with the second panel 41 such that the flexible fingers 35-38 fit within the hole 40 of the second panel 41. The user than rotates the handle 15 in a quarter turn in the clockwise direction as shown in FIG. 2, i.e., to the left. This moves the bottom edge 45 of the handle 15 from the unlocking ramp position 29 over the top of the ring 30 and into the locking indentation 27. When the bottom edge 45 moves over the top of the ring 30, the stud member 11 is moved in the direction of arrow 46, i.e., it is moved upwardly along its axis 17. Such upward axial motion brings the camming means 19 of the stud member 11 against the sloping walls 47 of the flexible fingers. The camming action between the cam means and the sloping walls 47 forces the flexible fingers outwardly in relationship to the axis 17 and causes the outer walls of the flexible fingers to grip the internal wall of the second panel.

What is claimed is:

1. A fastener securing together a first and a second panel each having an opening therethrough, said fastener including:
    a stud member having an imaginary central axis and a handle by which the stud member may be rotated about its axis to open or close said fastener, said handle having two sides projecting in opposite directions away from said axis and each side having a straight bottom camming edge,
    a ramp means fixed to the side of said first panel away from said second panel and comprising the only ramp means of the fastener, said rap means comprising a ring having two diagonally opposed ramps on its upper end;
    upon rotation of said stud member about its axis each of the said bottom camming edges cams upon one of the said opposed ramps to move said stud member in the direction of its axis to close said fastener;
    a plurality of at least three flexible and resilient finger members integral with said ramp means and arranged around said stud member and positioned within the hole of said second panel with each finger member having an internal slanted wall and an external wall to be wedged against said second panel;
    on rotation of said stud member and its axial movement to close said fastener, said stud member contacting said finger means internal walls and camming them outwardly with respect to the axis of said stud member to thereby wedge said finger members against the internal wall of said second panel hole.

* * * * *